(12) United States Patent
Song et al.

(10) Patent No.: US 9,538,178 B2
(45) Date of Patent: Jan. 3, 2017

(54) DEVICE AND METHOD FOR COMPETITION-BASED INTRA PREDICTION ENCODING/DECODING USING MULTIPLE PREDICTION FILTERS

(75) Inventors: Jinhan Song, Seoul (KR); Jeongyeon Lim, Gyeonggi-do (KR); Yonggoo Kim, Seoul (KR); Yoonsik Choe, Gyeonggi-do (KR); Yung Ho Choi, Gyeonggi-Do (KR); Sungjei Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 911 days.

(21) Appl. No.: 13/811,603

(22) PCT Filed: Jul. 19, 2011

(86) PCT No.: PCT/KR2011/005291

§ 371 (c)(1),
(2), (4) Date: Apr. 24, 2013

(87) PCT Pub. No.: WO2012/011714

PCT Pub. Date: Jan. 26, 2012

(65) Prior Publication Data

US 2013/0215960 A1  Aug. 22, 2013

(30) Foreign Application Priority Data

Jul. 20, 2010  (KR) .................. 10-2010-0070009

(51) Int. Cl.
*H04N 19/00* (2014.01)
*H04N 19/50* (2014.01)
(Continued)

(52) U.S. Cl.
CPC ...... *H04N 19/00569* (2013.01); *H04N 19/117* (2014.11); *H04N 19/15* (2014.11);
(Continued)

(58) Field of Classification Search
USPC ......................... 375/240.02–240.2
See application file for complete search history.

(56) References Cited

U.S. PATENT DOCUMENTS

2003/0223495 A1* 12/2003 Sun ...................... H04N 19/197
375/240.12
2004/0076333 A1*  4/2004 Zhang .................. H04N 19/197
382/238

(Continued)

FOREIGN PATENT DOCUMENTS

KR  10-2009-0095014  9/2009
KR  10-2010-0045007  5/2010

OTHER PUBLICATIONS

International Search Report mailed Mar. 12, 2012 for PCT/KR2011/005291.

*Primary Examiner* — Dave Czekaj
*Assistant Examiner* — Shanika Brumfield
(74) *Attorney, Agent, or Firm* — Hauptman Ham, LLP

(57) ABSTRACT

An intra prediction encoding apparatus includes: an optimal filter selecting unit for providing a plurality of extrapolation prediction filter candidates for filtering pixels adjacent to a current block to be encoded, with respect to each intra prediction direction or prediction mode of the current block, and selecting a filter having lowest encoding cost among the plurality of extrapolation prediction filter candidates; a residual signal generating unit for generating an extrapolation prediction value of the current block through the filter selected by the optimal filter selecting unit, and generating a residual signal by calculating a difference between a generated extrapolation prediction value of the current block and a pixel value of the current block; a transform and quantization unit for performing transform and quantization on the residual signal generated by the residual signal generating unit; and an entropy encoding unit for performing (Continued)

entropy encoding on a transformed and quantized residual signal.

8 Claims, 6 Drawing Sheets

(51) Int. Cl.
*H04N 19/176* (2014.01)
*H04N 19/15* (2014.01)
*H04N 19/593* (2014.01)
*H04N 19/117* (2014.01)
*H04N 19/46* (2014.01)

(52) U.S. Cl.
CPC ......... *H04N 19/176* (2014.11); *H04N 19/593* (2014.11); *H04N 19/46* (2014.11)

(56) References Cited

U.S. PATENT DOCUMENTS

| 2009/0245353 | A1* | 10/2009 | Choi | H04N 19/176 375/240.12 |
| 2010/0128995 | A1* | 5/2010 | Drugeon | H04N 19/00733 382/238 |
| 2011/0002386 | A1* | 1/2011 | Zhang | H04N 19/105 375/240.15 |

* cited by examiner

DEVICE AND METHOD FOR COMPETITION-BASED INTRA PREDICTION ENCODING/DECODING USING MULTIPLE PREDICTION FILTERS

CROSS REFERENCE TO RELATED APPLICATION

This application claims the priority of Korean Patent Application No. 10-2010-0070009, filed on Jul. 20, 2010 in the KIPO (Korean Intellectual Property Office). Further, this application is the National Phase application of International Application No. PCT/KR2011/005291 filed on Jul. 19, 2011, which designates the United States and was published in Korean.

TECHNICAL FIELD

The present disclosure in one or more embodiments relates to an apparatus and method for intra prediction encoding/decoding. More particularly, the present disclosure relates to an apparatus and method for competition-based intra prediction encoding/decoding using multiple prediction filters through selecting an optimal filter among a plurality of extrapolation prediction filter candidates to provide an even better encoding/decoding performance.

BACKGROUND

The statements in this section merely provide background information related to the present disclosure and may not constitute prior art.

In a video data compression apparatus, intra coding achieves efficient compression by performing transform, quantization, and entropy encoding on a residual signal obtained by efficiently removing spatial redundancy from a frame or block.

Representative examples of intra coding may include Joint Photographic coding Experts Group (JPEG) that is compression technique based on a block-wise Discrete Cosine Transform (DCT), and JPEG2000 that increases coding efficiency through an arithmetic coding technique based on Wavelet. It is known that intra coding technique using direction-based extrapolation prediction of H.264/AVC has the most excellent performance.

As shown in FIG. 1, the intra coding through direction-based prediction of H.264/AVC performs extrapolation prediction by using left and upper pixels A to M, of which encoding/decoding has been completed based on nine directions, including DC prediction (mode 2). That is, extrapolation prediction of a pixel value within a block is performed by filling the block with values taken from the left and upper pixels along prediction directions. For example, in the case of mode 0, extrapolation prediction is performed in a vertical direction, which has a 4×4 block of FIG. 1 filled with values of its upper pixels A, B, C, and D in arrow directions.

However, when a block to be encoded corresponds to a complicated texture area or a spatial gradient between pixels which is caused by light, spatial redundancy may not be efficiently removed during intra coding. In order to effectively solve this problem, an improved prediction technique has been proposed to compose a single pixel value to be predicted during extrapolation prediction with a combination of two or more adjacent pixels. However, this technique has a factor to limit the improvement of prediction performance by leaving a residual signal with respect to a block having only one principal edge.

DISCLOSURE

Technical Problem

Therefore, in order to solve the limitation of the extrapolation prediction technique having a factor to limit prediction performance with respect to a block having various features and the limitation of performance in an image having only a principal edge, one or more embodiments of the present are directed to provide an apparatus and method for competition-based intra prediction encoding/decoding using multiple prediction filters through selecting an optimal filter among a plurality of extrapolation prediction filter candidates to provide an even better encoding/decoding performance of a block to be currently encoded.

SUMMARY

An aspect of the present disclosure provides an intra prediction encoding/decoding apparatus including: an encoder for providing a plurality of extrapolation prediction filter candidates for filtering pixels adjacent to a current block to be encoded, with respect to each intra prediction direction or prediction mode of the current block, selecting a filter having lowest encoding cost among the plurality of extrapolation prediction filter candidates, and performing intra prediction encoding on the current block, based on a selected filter; and a decoder for providing a plurality of extrapolation prediction filter candidates for filtering pixels adjacent to a target block to be decoded, with respect to each intra prediction direction or prediction mode of the target block, receiving filter information used for encoding the target block with respect to an encoding signal input from the encoder, and performing intra prediction decoding on the target block, based on received filter information.

Another aspect of the present disclosure provides an intra prediction encoding apparatus including: an optimal filter selecting unit for providing a plurality of extrapolation prediction filter candidates for filtering pixels adjacent to a current block to be encoded, with respect to each intra prediction direction or prediction mode of the current block, and selecting a filter having lowest encoding cost among the plurality of extrapolation prediction filter candidates; a residual signal generating unit for generating an extrapolation prediction value of the current block through the filter selected by the optimal filter selecting unit, and generating a residual signal by calculating a difference between a generated extrapolation prediction value of the current block and a pixel value of the current block; a transform and quantization unit for performing transform and quantization on the residual signal generated by the residual signal generating unit; and an entropy encoding unit for performing entropy encoding on a transformed and quantized residual signal.

The intra prediction encoding apparatus may further include an optimal filter encoding unit for encoding an index of a selected filter with respect to said each intra prediction direction or prediction mode of the current block.

The optimal filter encoding unit may encode the index of the selected filter by using a redundancy between indexes of adjacent filters with respect to said each intra prediction direction or prediction mode of the current block.

The optimal filter encoding unit may assign a fixed bit value to each of the extrapolation prediction filter candidates with respect to said each intra prediction direction or prediction mode of the current block, and transmit a bit value of the selected filter to a decoder.

The intra prediction encoding apparatus may further include a filter updating unit for designing the plurality of extrapolation prediction filter candidates of the current block, based on a filter used in a previously encoded block.

The intra prediction encoding apparatus may further include a filter updating unit for designing the plurality of extrapolation prediction filter candidates of the current block, based on information about a mode of a current frame to be encoded, a pixel value of the current block, and pixel values of the pixels adjacent to the current block.

Still another aspect of the present disclosure provides an intra prediction decoding apparatus including: an entropy decoding unit for reading and reconstructing information about a target block to be decoded, with respect to an input encoding signal; an inverse quantization and inverse transform unit for performing inverse quantization and inverse transform on the information r reconstructed by the entropy decoding unit; a filter selecting unit for providing a plurality of extrapolation prediction filter candidates for filtering pixels adjacent to the target block with respect to each intra prediction direction or prediction mode of the target block, receiving and reconstructing filter information used for encoding the target block with respect to the input encoding signal, and selecting a filter corresponding to received filter information among the plurality of extrapolation prediction filter candidates; an extrapolation prediction unit for predicting an extrapolated pixel value of the target block, based on a selected filter; and a current block decoding unit for reconstructing the target block by adding an output value of the inverse quantization and inverse transform unit to the extrapolated pixel value predicted by the extrapolation prediction unit.

The intra prediction decoding apparatus may further include a filter updating unit for designing the plurality of extrapolation prediction filter candidates of the target block, based on a filter used in a previously decoded block.

The intra prediction decoding apparatus may further include a filter updating unit for designing the plurality of extrapolation prediction filter candidates of the target block, based on information about a mode of a target frame to be decoded, a pixel value of the target block, and pixel values of the pixels adjacent to the target block.

Yet another aspect of the present disclosure provides an intra prediction encoding/decoding method including: providing a plurality of extrapolation prediction filter candidates for filtering pixels adjacent to a current block to be encoded, with respect to each intra prediction direction or prediction mode of the current block, selecting a filter having lowest encoding cost among the plurality of extrapolation prediction filter candidates, and performing intra prediction encoding on the current block, based on a selected filter; and providing a plurality of extrapolation prediction filter candidates for filtering pixels adjacent to a target block to be decoded, with respect to each intra prediction direction or prediction mode of the target block, receiving filter information used for encoding the target block with respect to an encoding signal input by the intra prediction encoding, and performing intra prediction decoding on the target block, based on received filter information.

Yet another aspect of the present disclosure provides an intra prediction encoding method including: providing a plurality of extrapolation prediction filter candidates for filtering pixels adjacent to a current block to be encoded, with respect to each intra prediction direction or prediction mode of the current block, and selecting a filter having lowest encoding cost among the plurality of extrapolation prediction filter candidates; generating an extrapolation prediction value of the current block through the filter selected by optimal filter selecting step, and generating a residual signal by calculating a difference between a generated extrapolation prediction value of the current block and a pixel value of the current block; performing transform and quantization on the residual signal generated by residual signal generating step; and performing entropy encoding on a transformed and quantized residual signal.

The intra prediction encoding method may further include encoding an index of a selected filter with respect to said each intra prediction direction or prediction mode of the current block.

The index of the selected filter may be encoded by using a redundancy between indexes of adjacent filters with respect to said each intra prediction direction or prediction mode of the current block.

Encoding the index of the selected filter may include assigning a fixed bit value to each of the extrapolation prediction filter candidates with respect to said each intra prediction direction or prediction mode of the current block, and transmitting a bit value of the selected filter to a decoder.

The intra prediction encoding method may further include designing the plurality of extrapolation prediction filter candidates of the current block, based on a filter used in a previously encoded block.

The intra prediction decoding method may further include designing the plurality of extrapolation prediction filter candidates of the current block, based on information about a mode of a current frame to be encoded, a pixel value of the current block, and pixel values of the pixels adjacent to the current block.

Yet another aspect of the present disclosure provides an intra prediction decoding method including: reconstructing entropy of a target block to be decoded, with respect to an input encoding signal; providing a plurality of extrapolation prediction filter candidates for filtering pixels adjacent to the target block with respect to each intra prediction direction or prediction mode of the target block, receiving and reconstructing filter information used for encoding the target block with respect to the input encoding signal, and selecting a filter corresponding to received filter information among the plurality of extrapolation prediction filter candidates; performing inverse quantization and inverse transform on the information r reconstructed d by entropy reconstruction; predicting an extrapolated pixel value of the target block, based on a selected filter; and reconstructing the target block by adding a value output by the inverse quantization and inverse transform to the extrapolated pixel value predicted by extrapolated pixel value prediction.

The intra prediction decoding method may further include designing the plurality of extrapolation prediction filter candidates of the target block, based on a filter used in a previously decoded block.

The intra prediction decoding method may further include designing the plurality of extrapolation prediction filter candidates of the target block, based on information about a mode of a target frame to be decoded, a pixel value of the target block, and pixel values of the pixels adjacent to the target block.

Advantageous Effects

According to the present disclosure as described above, it is possible to efficiently solve the limitation of the extrapolation prediction technique having a factor to limit prediction performance of a block having various features and the limitation of performance in an image having only a principal edge, and an even better encoding/decoding performance of a block to be currently encoded can be provided by selecting an optimal filter among a plurality of extrapolation prediction filter candidates.

DETAILED DESCRIPTION

Figure 1:
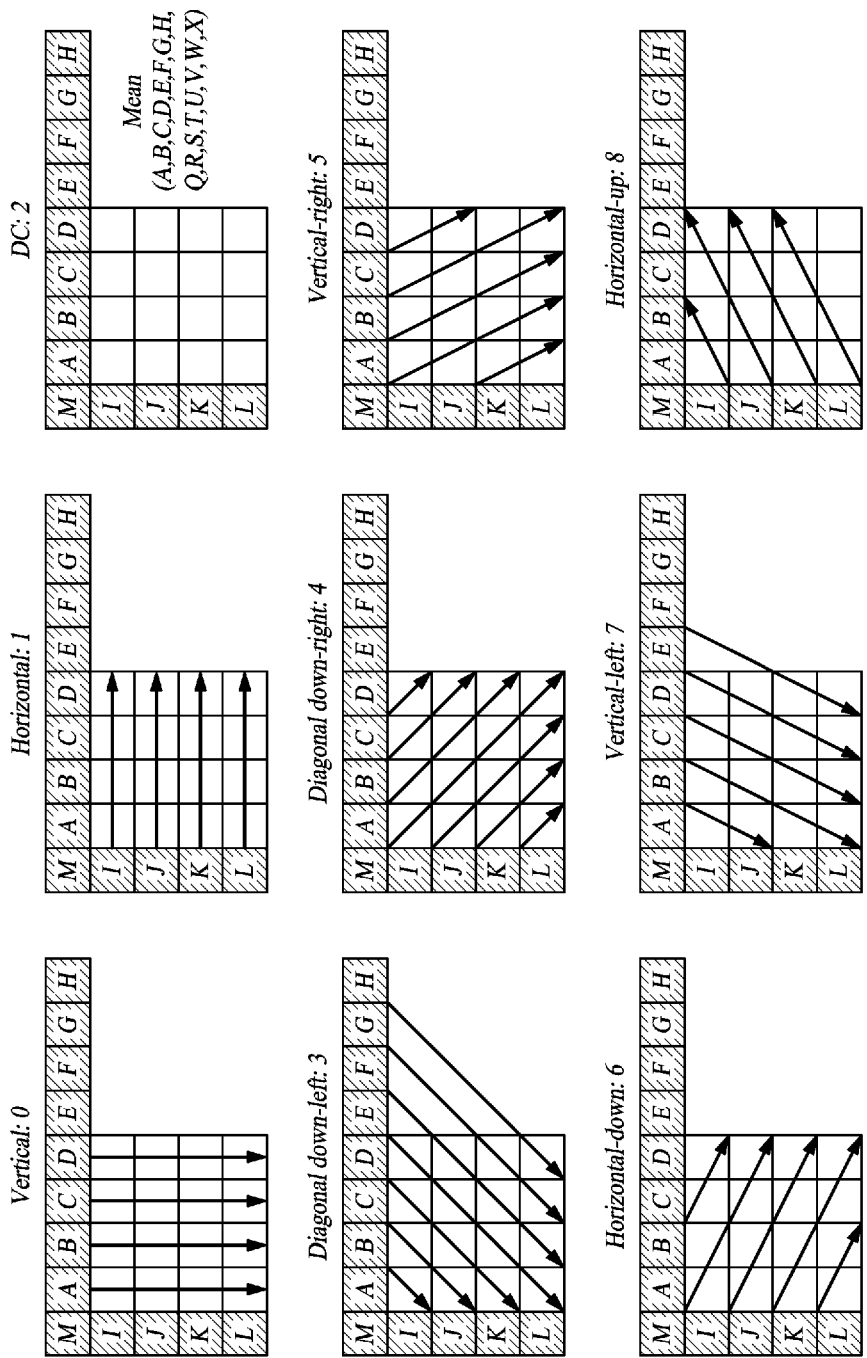
FIG. 1 is a diagram showing intra prediction modes according to H.264.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 2:
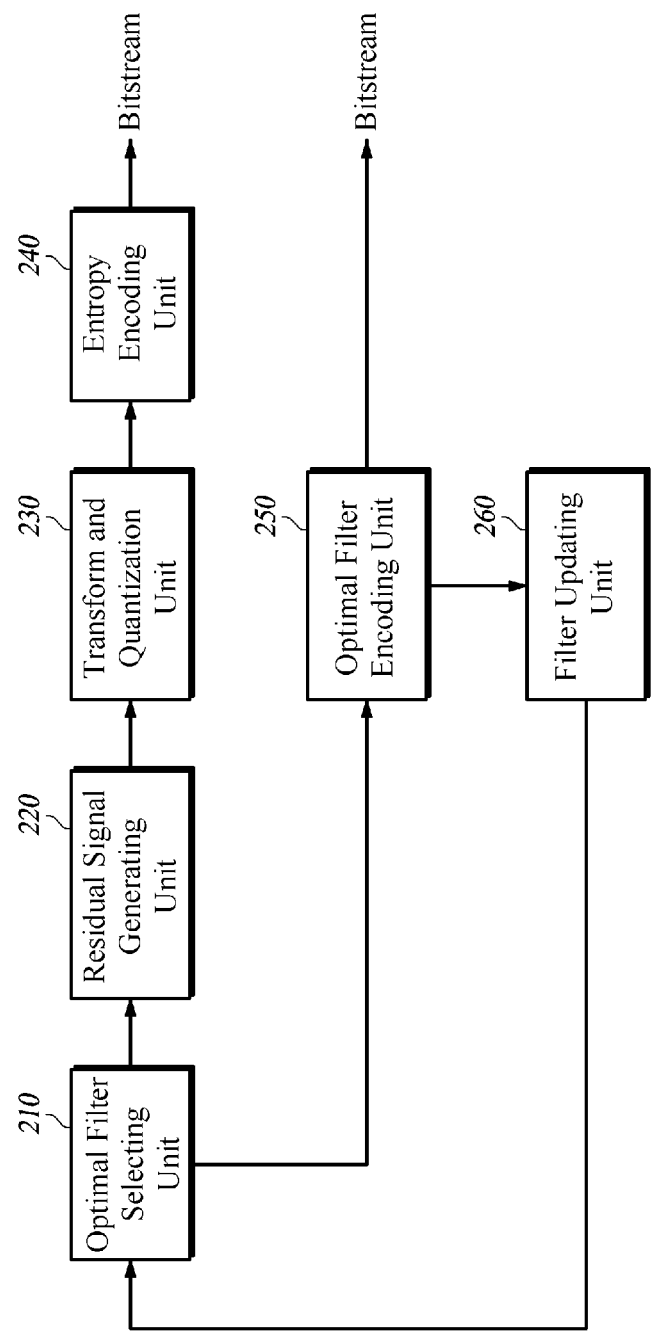
FIG. 2 is a block diagram schematically showing an intra prediction encoding apparatus according to one or more embodiments of the present invention.

FIG. 2 is a block diagram schematically showing an intra prediction encoding apparatus according to one or more embodiments of the present invention.

Referring to FIG. 2, the intra prediction encoding apparatus 200 according to one or more embodiments of the present invention may include an optimal filter selecting unit 210, a residual signal generating unit 220, a transform/quantization unit 230, an entropy encoding unit 240, an optimal filter encoding unit 250, and a filter updating unit 260.

Figure 3:
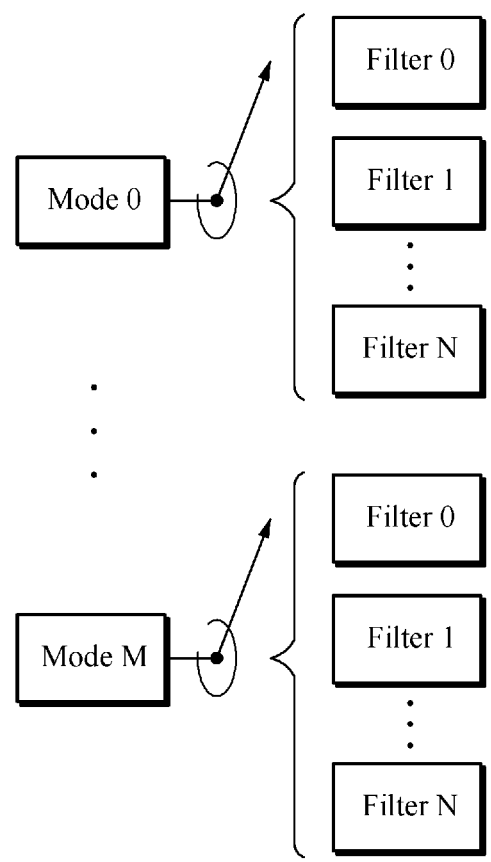
FIG. 3 is an exemplary diagram of N different extrapolation prediction filters with respect to M intra prediction modes.

The optimal filter selecting unit 210 provides a plurality of extrapolation prediction filter candidates for filtering pixels adjacent to a current block to be encoded, with respect to each intra prediction direction or prediction mode of the current block, and selects a filter having the lowest encoding cost among the plurality of extrapolation prediction filter candidates. As shown in FIG. 3, N extrapolation prediction filters for filtering pixels adjacent to a current block to be encoded may be provided with respect to each intra prediction direction or prediction mode of the current block. For example, in the case of nine intra prediction modes according to H.264, N extrapolation prediction filter candidates may be provided with respect to each prediction mode. The extrapolation prediction filters may be generated through a training process and may be differentially provided according to weight values of pixel values of adjacent blocks with respect to pixel values of the current block. The types of the intra prediction modes according to one or more embodiments of the present invention are not limited to the nine intra prediction modes of H.264, and can also be applied to a variety of modified intra prediction modes.

The optimal filter selecting unit 210 selects a filter having the lowest encoding cost when an extrapolation prediction value of the current block is generated by using the extrapolation prediction filter candidates provided with respect to each intra prediction direction or prediction mode. The optimal filter selecting unit 210 may predict an intra prediction direction of the current block from the pixels adjacent to the current block, and select an optimal filter among the extrapolation prediction filter candidates provided in the corresponding intra prediction direction. Alternatively, the optimal filter selecting unit 210 may compare encoding costs for the extrapolation predictions of the extrapolation prediction filter candidates with respect to all the intra prediction directions of the current block, and select a filter having the lowest encoding cost.

The residual signal generating unit 220 generates an extrapolation prediction value of the current block through the filter selected by the optimal filter selecting unit 210, and generates a residual signal by calculating a difference between the generated extrapolation prediction value of the current block and the pixel value of the current block.

The transform and quantization unit 230 performs a block-based transform or an image-based transform and quantization on the residual signal generated by the residual signal generating unit 220. Examples of the block-based transform may include a Karhunen-Loeve Transform (KLT), a Singular Value Decomposition (SVD), and a Discrete Cosine Transform (DCT), and examples of the image-based transform may include a Discrete Wavelet Transform (DWT).

The entropy encoding unit 240 generates a bitstream of 0 and 1 by performing entropy encoding on the residual signal transformed and quantized by the transform and quantization unit 230. Examples of the entropy encoding may include an Exponential Golomb, a Context-Adaptive Variable Length Coding (CAVLC), and a Context-Adaptive Binary Arithmetic Coding (CABAC).

The optimal filter encoding unit 250 encodes an index of the selected filter with respect to each intra prediction direction or prediction mode of the current block. In addition, the optimal filter encoding unit 250 can encode the index of the selected filter by using a redundancy between indexes of adjacent filters with respect to each intra prediction direction or prediction mode of the current block. Alternatively, the optimal filter encoding unit 250 can assign a fixed bit value to each extrapolation prediction filter candidate with respect to each intra prediction direction or prediction mode of the current block, and transmit the bit value of the selected filter to a decoder.

The filter updating unit 260 can design a plurality of extrapolation prediction filter candidates of the current block, based on the filter used in the previously encoded block. For example, extrapolation prediction filter candidates of the target block to be encoded can be designed by predicting an intra prediction direction of the target block from a prediction mode of encoded blocks which are disposed on the left or upper side of the target block, and predicting a plurality of extrapolation prediction filter candidates from the adjacent block used for the corresponding prediction.

Alternatively, the filter updating unit 260 can design a plurality of extrapolation prediction filter candidates of the current block, based on information about a mode of a current frame to be encoded, a pixel value of the current block, and pixel values of the pixels adjacent to the current block. That is, the filter updating unit 260 can determine weight values of the pixels of the adjacent blocks with respect to the pixel of the current block, based on information about the mode of the current frame to be encoded, the pixel value of the current block, and the pixel values of the pixels adjacent to the current block, and design extrapolation prediction filter candidates differentially according to the determined weight values.

Figure 4:
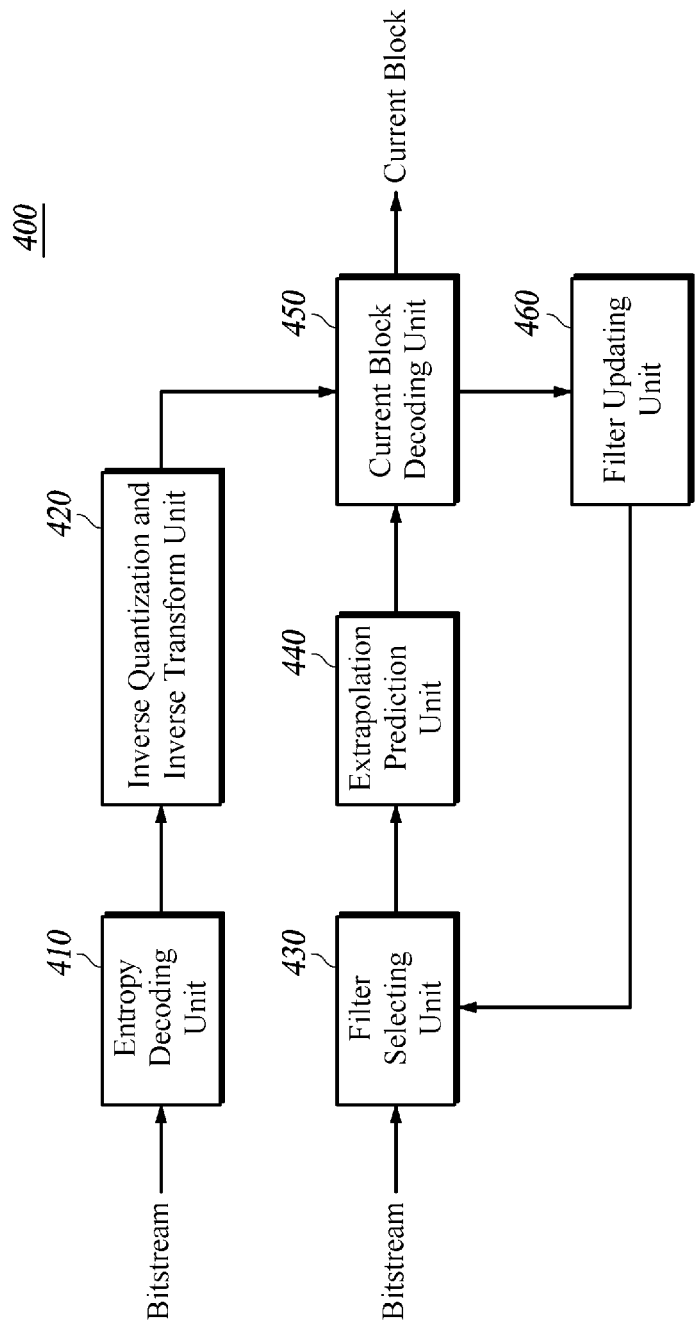
FIG. 4 is a block diagram schematically showing an intra prediction decoding apparatus according to one or more embodiments of the present invention.

FIG. 4 is a block diagram schematically showing an intra prediction decoding apparatus according to one or more embodiments of the present invention.

Referring to FIG. 4, the intra prediction decoding apparatus 400 according to one or more embodiments of the present invention may include an entropy decoding unit 410, an inverse quantization and inverse transform unit 420, a filter selecting unit 430, an extrapolation prediction unit 440, a current block decoding unit 450, and a filter updating unit 460.

The entropy decoding unit 410 reads and reconstructs information about a target block to be decoded, with respect to an encoding signal (bitstream) input from the intra prediction encoding apparatus 200.

The inverse quantization and inverse transform unit 420 performs inverse quantization and inverse frequency conversion on the information reconstructed by the entropy decoding unit 410.

The filter selecting unit 430 provides a plurality of extrapolation prediction filter candidates for filtering pixels adjacent to the target block with respect to each intra prediction direction or prediction mode of the target block, receives filter information used for encoding the target block with respect to the encoding signal input from the intra prediction encoding apparatus 200, and selects a filter corresponding to the received filter information among the extrapolation prediction filter candidates. That is, the filter selecting unit 430 receives the filter information about the intra prediction direction of the target block to be decoded and the extrapolation prediction filter used therein, from the bitstream received from the intra prediction encoding apparatus 200, and selects a filter corresponding to the received filter information among the extrapolation prediction filter candidates.

The extrapolation prediction unit 440 predicts an extrapolated pixel value of the target block, based on the filter selected by the filter selecting unit 430.

The current block decoding unit 450 reconstructs the target block by adding an output value of the inverse quantization and inverse transform unit 420 to the extrapolated pixel value predicted by the extrapolation prediction unit 440.

The filter updating unit 460 can design a plurality of extrapolation prediction filter candidates of the current target block to be decoded, based on the filter used in the previously decoded block. For example, extrapolation prediction filter candidates of the target block to be decoded can be designed by predicting an intra prediction direction of the target block from a prediction mode of encoded blocks which are disposed on the left or upper side of the target block to be decoded, and predicting a plurality of extrapolation prediction filter candidates from the adjacent block used for the corresponding prediction.

Alternatively, the filter updating unit 460 can design a plurality of extrapolation prediction filter candidates of the target block, based on information about a mode of a target frame to be decoded, a pixel value of the target block, and pixel values of the pixels adjacent to the target block. That is, the filter updating unit 460 can determine weight values of the pixels of the adjacent blocks with respect to the pixel of the target block, based on information about the mode of the target frame to be decoded, the pixel value of the target block, and the pixel values of the pixels adjacent to the target block, and design extrapolation prediction filter candidates differentially according to the determined weight values.

Figure 5:
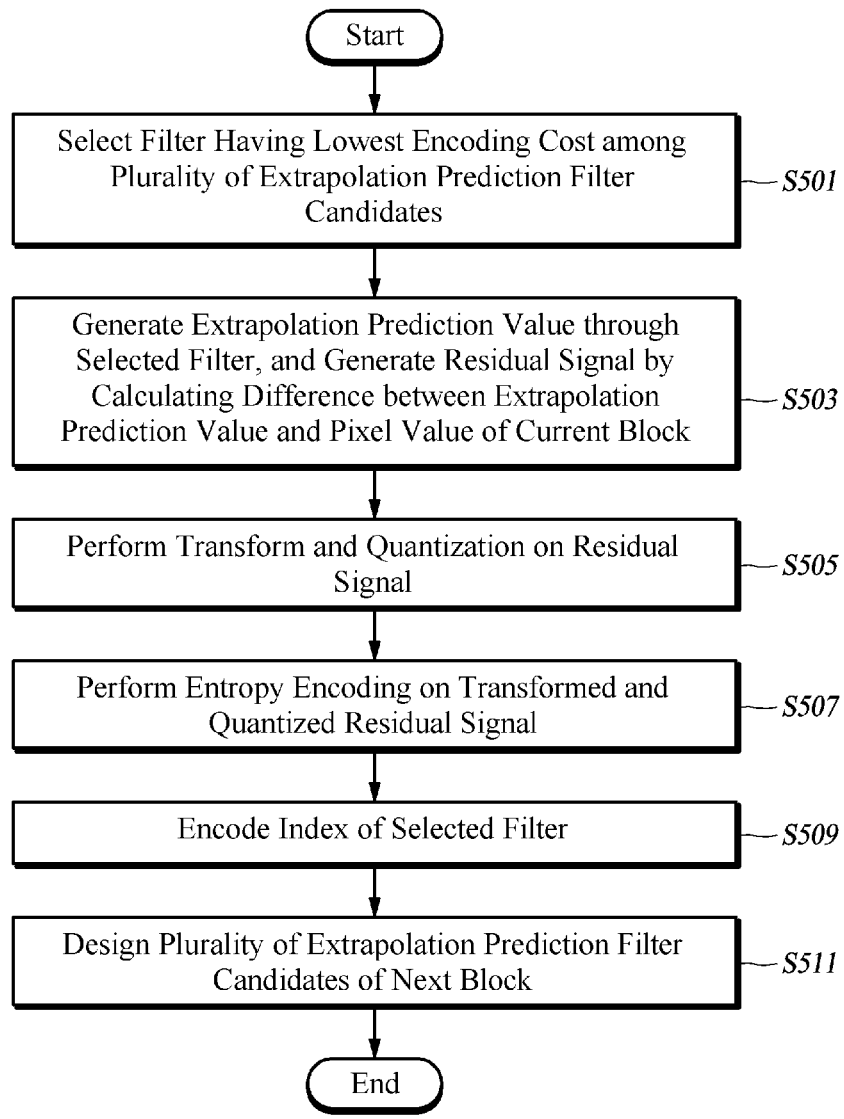
FIG. 5 is a flow chart showing an intra prediction encoding method according to one or more embodiments of the present invention.

FIG. 5 is a flow chart showing an intra prediction encoding method according to one or more embodiments of the present invention.

The optimal filter selecting unit 210 provides a plurality of extrapolation prediction filter candidates for filtering adjacent pixels of a current block to be encoded, with respect to each intra prediction direction or prediction mode of the current block, and selects a filter having the lowest encoding cost among the plurality of extrapolation prediction filter candidates (S501). The optimal filter selecting unit 210 may predict an intra prediction direction of the current block from the pixels adjacent to the current block, and select an optimal filter among the extrapolation prediction filter candidates provided in the corresponding intra prediction direction. Alternatively, the optimal filter selecting unit 210 may compare encoding costs for the extrapolation predictions of the extrapolation prediction filter candidates with respect to all the intra prediction directions of the current block, and select a filter having the lowest encoding cost.

The residual signal generating unit 220 generates an extrapolation prediction value of the current block through the filter selected by the optimal filter selecting unit 210, and generates a residual signal by calculating a difference between the generated extrapolation prediction value of the current block and the pixel value of the current block (S503).

The transform and quantization unit 230 performs a block-based transform or an image-based transform and quantization on the residual signal generated by the residual signal generating unit 220 (S505). Examples of the block-based transform may include a Karhunen-Loeve Transform (KLT), a Singular Value Decomposition (SVD), and a Discrete Cosine Transform (DCT), and examples of the image-based transform may include a Discrete Wavelet Transform (DWT).

The entropy encoding unit 240 generates a bitstream of 0 and 1 by performing entropy encoding on the residual signal transformed and quantized by the transform and quantization unit 230 (S507). Examples of the entropy encoding may include an Exponential Golomb, a Context-Adaptive Variable Length Coding (CAVLC), and a Context-Adaptive Binary Arithmetic Coding (CABAC).

The optimal filter encoding unit 250 encodes an index of the selected filter with respect to each intra prediction direction or prediction mode of the current block (S509). The optimal filter encoding unit 250 can encode the index of the selected filter by using a redundancy between indexes of adjacent filters with respect to each intra prediction direction or prediction mode of the current block. Alternatively, the optimal filter encoding unit 250 can assign a fixed bit value to each extrapolation prediction filter candidate with respect to each intra prediction direction or prediction mode of the current block, and transmit the bit value of the selected filter to a decoder.

The filter updating unit 260 can design a plurality of extrapolation prediction filter candidates of the current block, based on the filter used in the previously encoded block (S511). For example, extrapolation prediction filter candidates of the target block to be encoded can be designed by predicting an intra prediction direction of the target block from a prediction mode of encoded blocks which are disposed on the left or upper side of the target block, and predicting a plurality of extrapolation prediction filter candidates from the adjacent block used for the corresponding prediction. Alternatively, the filter updating unit 260 can design a plurality of extrapolation prediction filter candidates of the current block, based on information about a mode of a current frame to be encoded, a pixel value of the current block, and pixel values of the pixels adjacent to the current block.

Figure 6:
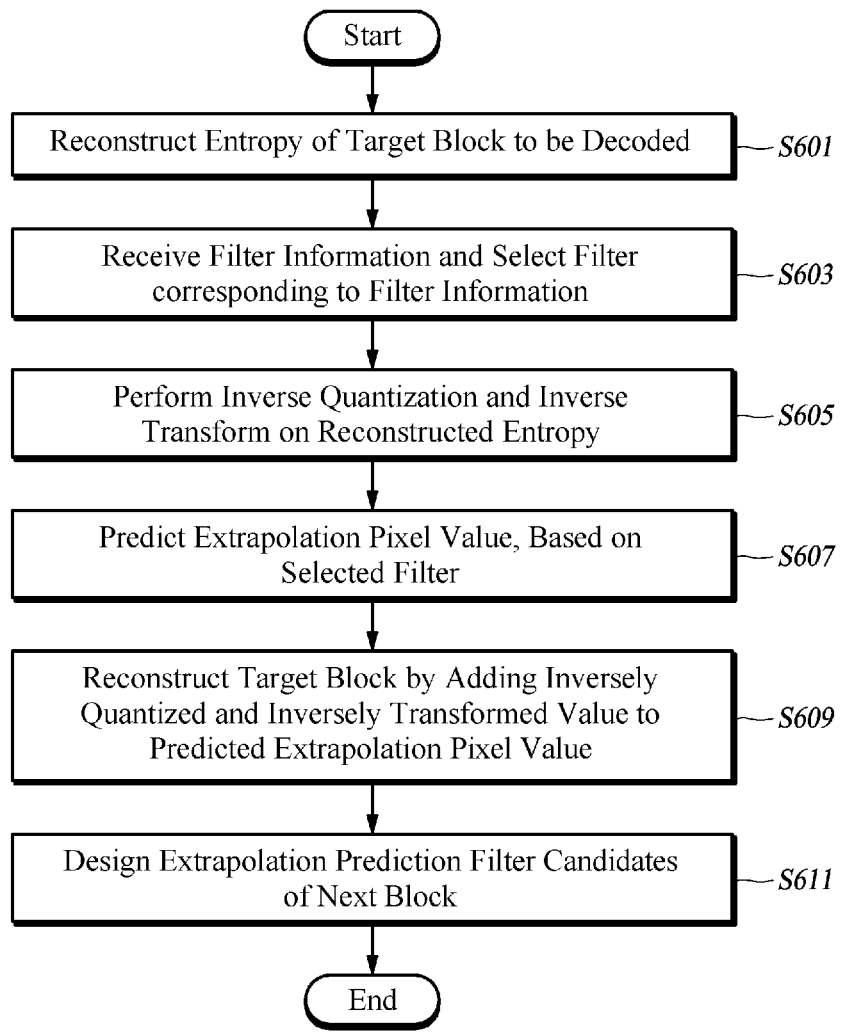
FIG. 6 is a flow chart showing an intra prediction decoding method according to one or more embodiments of the present invention.

FIG. 6 is a flow chart showing an intra prediction decoding method according to one or more embodiments of the present invention.

The entropy decoding unit 410 reads and reconstructs information about a target block to be decoded, with respect to an encoding signal (bitstream) input from the intra prediction encoding apparatus 200 (S601).

The filter selecting unit 430 provides a plurality of extrapolation prediction filter candidates for filtering pixels adjacent to the target block with respect to each intra prediction direction or prediction mode of the target block, receives filter information used for encoding the target block with respect to the encoding signal input from the intra prediction encoding apparatus 200, and selects a filter corresponding to the received filter information among the extrapolation prediction filter candidates (S603). That is, the filter selecting unit 430 receives the filter information about the intra prediction direction of the target block to be decoded and the extrapolation prediction filter used therein, from the bitstream received from the intra prediction encoding apparatus 200, and selects a filter corresponding to the received filter information among the extrapolation prediction filter candidates.

The inverse quantization and inverse transform unit 420 performs inverse quantization and inverse frequency conversion on the information reconstructed by the entropy decoding unit 410 (S605).

The extrapolation prediction unit 440 predicts an extrapolated pixel value of the target block, based on the filter selected by the filter selecting unit 430 (S607).

The current block decoding unit 450 reconstructs the target block by adding an output value of the inverse quantization and inverse transform unit 420 to the extrapolated pixel value predicted by the extrapolation prediction unit 440 (S609).

The filter updating unit 460 can design a plurality of extrapolation prediction filter candidates of the current target block to be decoded, based on the filter used in the previously decoded block (S611). Alternatively, the filter updating unit 460 can design a plurality of extrapolation prediction filter candidates of the target block, based on information about a mode of a target frame to be decoded, the pixel value of the target block, and the pixel values of the pixels adjacent to the target block.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impracticably unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of intra prediction encoding/decoding. According to the present disclosure, it is possible to efficiently solve the limitation of the extrapolation prediction technique having a factor to limit prediction performance of a block having various features and the limitation of performance in an image having only a main edge, and an even better encoding/decoding performance of a block to be currently encoded can be provided by selecting an optimal filter among a plurality of extrapolation prediction filter candidates.

The invention claimed is:

1. An intra prediction encoding apparatus comprising:
an optimal filter selecting unit configured to
   select an intra prediction mode of a current block from among a plurality of intra prediction modes, and
   select a filter from among a plurality of filter candidates, wherein the plurality of filter candidates is provided for the selected intra prediction mode for filtering pixels adjacent to the current block;
a filter updating unit configured to
   generate, according to the intra prediction mode of the current block, weight values of pixel values of the pixels adjacent to the current block with respect to one or more pixel values of the current block, and generate the plurality of filter candidates, based on the weight values;
a residual signal generating unit configured to
   perform a filtering of the pixels adjacent to the current block by using the selected filter, generate a prediction value of the current block according to the selected intra prediction mode by using the filtered pixels, and generate a residual signal by calculating a difference between a generated prediction value of the current block and a pixel value of the current block;

a transform and quantization unit configured to perform transform and quantization on the residual signal; and an entropy encoding unit configured to perform an entropy encoding on a transformed and quantized residual signal.

2. The intra prediction encoding apparatus of claim 1, further comprising an optimal filter encoding unit configured to encode an index of the selected filter.

3. The intra prediction encoding apparatus of claim 2, wherein the optimal filter encoding unit encodes the index of the selected filter by using a correlation between index of a filter of an adjacent block and the index of the selected filter.

4. An intra prediction decoding apparatus comprising:
an entropy decoding unit configured to reconstruct information on a current block to be decoded from a bitstream;

an inverse quantization and inverse transform unit configured to perform inverse quantization and inverse transform on the information reconstructed by the entropy decoding unit;

a filter selecting unit configured to
reconstruct an intra prediction mode of the current block from among a plurality of intra prediction modes,
reconstruct filter information of the current block from the bitstream, and
select a filter corresponding to the filter information from among a plurality of filter candidates, wherein the plurality of filter candidates is provided for the reconstructed intra prediction mode for filtering pixels adjacent to the current block;

a filter updating unit configured to
generate, according to the intra prediction mode of the current block, weight values of pixel values of the pixels adjacent to the current block with respect to one or more pixel values of the current block, and
generate the plurality of filter candidates, based on the weight values;

an extrapolation prediction unit configured to
perform a filtering of the pixels adjacent to the current block by using the selected filter, and
generate a prediction value of the current block according to the selected intra prediction mode, based on the filtered pixels; and a current block decoding unit configured to reconstruct the current block by adding an output value of the inverse quantization and inverse transform unit to the prediction value predicted by the extrapolation prediction unit.

5. An intra prediction encoding method comprising:
selecting an intra prediction mode of a current block from among a plurality of intra prediction modes;
generating, according to the intra prediction mode of the current block, weight values of pixel values of pixels adjacent to the current block with respect to one or more pixel values of the current block;
generating a plurality of filter candidates, based on the weight values;
selecting a filter from among the plurality of filter candidates, wherein the plurality of filter candidates is provided for the selected intra prediction mode for filtering the pixels adjacent to the current block;
performing a filtering of the pixels adjacent to the current block by using the selected filter;
generating a prediction value of the current block according to the selected intra prediction mode by using the filtered pixels;
generating a residual signal by calculating a difference between a generated prediction value of the current block and a pixel value of the current block;
performing transform and quantization on the residual signal; and
performing an entropy encoding on a transformed and quantized residual signal.

6. The intra prediction encoding method of claim 5, further comprising encoding an index of the selected filter.

7. The intra prediction encoding method of claim 6, wherein the index of the selected filter is encoded by using a correlation between index of a filter of an adjacent block and the index of the selected filter.

8. An intra prediction decoding method comprising:
reconstructing information on a current block from a bitstream;
reconstructing an intra prediction mode of the current block from among a plurality of intra prediction modes;
generating, according to the intra prediction mode of the current block, weight values of pixel values of pixels adjacent to the current block with respect to one or more pixel values of the current block;
generating a plurality of filter candidates, based on the weight values;
selecting a filter corresponding to the filter information from among the plurality of filter candidates, wherein the plurality of filter candidates is provided for the reconstructed intra prediction mode for filtering the pixels adjacent to the current block;
performing inverse quantization and inverse transform on the reconstructed information;
performing a filtering of the pixels adjacent to the current block by using the selected filter;
generating a prediction value of the current block according to the selected intra prediction mode, based on the filtered pixels; and
reconstructing the current block by adding a value output by the inverse quantization and inverse transform to the prediction value.

* * * * *